United States Patent
Haldorsen (10) Patent No.: US 11,656,106 B2
(45) Date of Patent: *May 23, 2023

(54) SUBSEA HOUSING ASSEMBLY

(71) Applicant: SIEMENS ENERGY AS, Oslo (NO)

(72) Inventor: Kjetil Haldorsen, Rubbestadneset (NO)

(73) Assignee: SIEMENS ENERGY AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,673

(22) Filed: Sep. 9, 2021

(65) Prior Publication Data

US 2021/0404845 A1 Dec. 30, 2021

Related U.S. Application Data (63) Continuation of application No. 15/633,806, filed on Jun. 27, 2017, now Pat. No. 11,137,272.

(30) Foreign Application Priority Data

Jul. 14, 2016 (EP) .................................. 16179521

(51) Int. Cl.
*G01D 11/24* (2006.01)
*E21B 33/037* (2006.01)
(Continued)

(52) U.S. Cl.
CPC .......... *G01D 11/245* (2013.01); *E21B 33/037* (2013.01); *E21B 33/0385* (2013.01); *G01D 11/26* (2013.01); *E21B 47/06* (2013.01)

(58) Field of Classification Search
CPC ... G01D 11/245; G01L 19/143; G01L 19/147; H02J 50/10
See application file for complete search history.

(56) References Cited

U.S. PATENT DOCUMENTS 4,402,382 A * 9/1983 Mollere .................. G01V 1/26
367/185
4,669,792 A * 6/1987 Kjeldstad ............. H01R 13/523
439/38

(Continued)

FOREIGN PATENT DOCUMENTS

WO 2008004086 A1 1/2008
WO 2015139953 A1 9/2015

OTHER PUBLICATIONS

Subsea Technology and Equipments (n.d.) Retrieved Nov. 21, 2015, from http://www.oil-gasportal.com/subsea-technology-and-equipments/.

(Continued)

*Primary Examiner* — Alexander A Mercado
(74) *Attorney, Agent, or Firm* — Wolter Van Dyke Davis, PLLC (57) ABSTRACT

A subsea housing assembly, in particular for a subsea sensor, includes a first housing portion and a second housing portion. The first housing portion includes a first electrical connection for data communication and the second housing portion includes a second electrical connection for data communication. A wall provides separation between the first housing portion and the second housing portion of the subsea housing. An inductive coupler, that includes a first coupling section disposed in the first housing portion and a second coupling section disposed in the second housing portion, is provided. The inductive coupler is configured to provide inductive coupling across the wall for providing at least a data communication between the first and second electrical connections.

11 Claims, 2 Drawing Sheets

(51) Int. Cl.
*E21B 33/038* (2006.01)
*G01D 11/26* (2006.01)
*E21B 47/06* (2012.01)

(56) References Cited

U.S. PATENT DOCUMENTS

| | | | | |
|---|---|---|---|---|
| 4,788,448 | A * | 11/1988 | Crowe | H02M 3/28 |
| | | | | 340/310.17 |
| 6,564,011 | B1 * | 5/2003 | Janoff | F16L 53/38 |
| | | | | 392/479 |
| 8,082,990 | B2 | 12/2011 | Lovell et al. | |
| 10,026,537 | B2 * | 7/2018 | Bjoerkhaug | H01F 27/14 |
| 2003/0218547 | A1 | 11/2003 | Smits et al. | |
| 2007/0258330 | A1 * | 11/2007 | Berg | G01V 1/16 |
| | | | | 367/149 |
| 2016/0024869 | A1 | 1/2016 | Vachon et al. | |
| 2017/0030160 | A1 * | 2/2017 | Gray | H02J 50/10 |
| 2017/0250578 | A1 * | 8/2017 | Kallman | H02J 50/005 |

OTHER PUBLICATIONS

Extended European Search Report dated Jan. 23, 2017 for corresponding European patent application No. EP 16179521.6 filed Jul. 14, 2016.

\* cited by examiner

SUBSEA HOUSING ASSEMBLY

CROSS REFERENCE TO RELATED APPLICATIONS

This application in a Continuation of U.S. application Ser. No. 15/633,806 filed Jun. 27, 2017, which claims the benefit of European Application No. EP 16179521.6 filed Jul. 14, 2016, both of which are incorporated by reference herein in their entireties.

FIELD OF THE INVENTION

The present invention relates to a subsea housing assembly and to a subsea sensor.

BACKGROUND

Subsea sensors have several applications in subsea processing facilities. Examples of subsea sensors include temperature sensors, absolute or line pressure sensors, differential pressure sensors and the like. A sensor may for example be mounted to a pipe section, through which a process fluid flows, such as a gas, a liquid, or a multiphase fluid (which can include gaseous, liquid and solid constituents). In particular in subsea applications, the pressure of such process fluid can reach relatively large values, such as for example in excess of 1,000 or 1,400 bar. When measuring parameters of such process fluid in a subsea environment, it has to be ensured that the process fluid does not leak into the seawater.

For this purpose, penetrators can be provided in subsea sensors that are capable of withstanding such large pressures. As an example, a glass penetrator may be employed that leads electrical connections to a sensor element and provides glass to metal sealing, such penetrator being capable of withstanding relatively large pressure differences.

In these applications, it is generally required to maintain a certain minimum electrical resistance (insulation resistance, IR) between the sensor housing and the electrical conductor that is led through an opening in the housing by such penetrator, for example a resistance of at least 1 GΩ. By taking up humidity, the resistance of such penetrator may drop below 1 GΩ. Furthermore, it is generally required to test such barriers to a pressure of 2.5 times of the maximum pressure. Accordingly, if such sensor is to be operated on a flow line which transports a process fluid at a pressure of about 1,400 bar, the test pressure would need to be on the order of about 3,500 bar. At such pressures, the glass-to-metal seal provided by the above mentioned penetrator may exceed its limits. Furthermore, when testing at such high pressures, especially under water, a low insulation resistance may result due to the above outlined taking up of humidity by the glass. Furthermore, an additional final treatment process, for example a drying process, may be required before installing such sensors in order to meet the specifications. Such process is time and cost intensive.

Accordingly, it is desirable to improve the performance of such subsea sensors, in particular to allow such subsea sensor to be used with high pressure process fluids, while meeting all the specifications, such as the required insulation resistance, and providing the required operational safety.

SUMMARY

Accordingly, there is a need for improvements related to subsea sensors and in particular with respect to the handling of such high process pressures.

This need is met by the features of the independent claims. The dependent claims describe embodiments of the invention.

According to an embodiment of the invention, a subsea housing assembly is provided. The subsea housing assembly comprises a subsea housing, wherein a first housing portion of the subsea housing comprises a first electrical connection for data communication, and wherein a second housing portion of the subsea housing comprises a second electrical connection for data communication. A wall provides separation between the first and second housing portions. The subsea housing assembly further includes an inductive coupler that comprises a first coupling section disposed in the first housing portion and a second coupling section disposed in the second housing portion. The inductive coupler is configured to provide inductive coupling across the wall for providing at least a data communication between the first electrical connection in the first housing portion and the second electrical connection in the second housing portion.

By providing a subsea housing assembly with such inductive coupler, a data communication can be established through the wall of the subsea housing which allows for example a better sealing of the first housing portion. For example when used in a subsea sensor, the first housing portion can comprise the sensor element, and the wall can provide a pressure barrier for the process fluid pressure so that the pressure can be confined to within the first housing portion. The data communication may for example include a communication of analog or digital sensor values or readings, it may for example include raw or processed sensor data.

By providing the inductive coupler, it is not necessary to provide glass penetrators including a glass to metal sealing. Accordingly, problems associated with large pressure differences across such penetrators and reduced insulation resistance of such penetrators may be avoided. The risk of a leakage may thus be reduced. Furthermore, since the separation is provided by the wall, and no penetrator is required, the testing standard may only require lower test pressures, thus facilitating the meeting of the specifications by a respective device comprising such subsea housing assembly.

In an embodiment, the wall may be a metal wall. In an embodiment, the barrier provided by the first housing portion and the wall may not include non-metallic parts. In particular, the sealing may be effected by metal-to-metal seals, and may not include glass-to-metal seals. The test pressure for metal barriers is generally lower than that required for non metallic barriers, so that a safer sealing may be achieved and lower test pressures can be employed.

In an embodiment, the wall is a pressure barrier configured to resist a predetermined minimum pressure difference across the wall. Such minimum pressure difference may for example be at least 1.5 times or even 2.5 times the expected process pressure (the pressure difference may be calculated with respect to zero or 1 bar pressure or with respect to a prevailing subsea pressure, depending on the application and the configuration of the second housing portion).

The inductive coupler may furthermore be configured to inductively supply electrical power from the electrical connection in the second housing portion to the electrical connection in the first housing portion. Accordingly, a sensor element disposed in the first housing portion may thus be supplied with electrical power.

In some configurations, a single electrical line may be provided for power supply and data communication, for example by providing a respective modulation on the power line. In other embodiments, separate lines may be provided and may be part of the respective electrical connection, for example dedicated lines for power supply and data communication. In some embodiments, the sensor may only be a passive sensor, and only the electrical power required to read such passive sensor may be transmitted by means of the inductive coupler. In other applications, further electric and/or electronic components may be provided in the first housing portion, for example for operating the sensor element or processing sensor data. The inductive coupler advantageously comprises the first and second coupling sections which provide both inductive coupling for data communication and power transfer. In other embodiments, the inductive coupler may comprise further coupling sections, for example for separately transferring electrical power and communication signals.

In an embodiment, the first housing portion comprises at least a first chamber. The chamber may be a pressure resistant chamber in which a predetermined pressure, in particular a pressure of less than 10 bar, less than 5 bar or less than 1.5 bar is maintained when the subsea housing assembly is installed subsea. Accordingly, conventional electric and electronic components may be used in such chamber. The chamber may be filled with a gas, such as air or nitrogen or another gas mixture. At least the first coupling section may be disposed in the first chamber. The first chamber may be sealed in a liquid tight manner. In particular, the first chamber may be hermetically sealed.

In other applications, the first chamber may be a pressure compensated chamber, the inner pressure of which is balanced to an ambient pressure, such as the surrounding subsea pressure when installed subsea.

The first housing portion may for example comprise a sensor assembly including diaphragms, such as a process diaphragm and a sensor diaphragm, a sensor element, medium filled channels or the like and may further include a first pressure barrier that provides separation between the pressure prevailing in such medium filled channels and the first chamber. As an example, a process diaphragm may transmit the pressure of the process fluid to such medium (e.g. oil) present in the channels, which in turn applies the pressure to a sensor element. Accordingly, if such first pressure barrier fails, and process fluid or process fluid pressure is transmitted into the first chamber, such fluid/pressure can be confined to within the first housing portion by means of the wall, which constitutes a second pressure barrier.

The first housing portion may be sealed against a metal body by means of a metal seal, in particular a metal gasket. As an example, the subsea housing assembly may be part of a subsea sensor, and the first housing portion may be sealed against a pipe section, for example a pipeline section or a flow duct in a Christmas tree or the like. The first housing portion may comprise a mounting flange for mounting the subsea housing assembly to such metal body.

In an embodiment, the subsea housing is a subsea housing of a subsea electrical device, and the first housing portion may comprise at least a first chamber, wherein electric and/or electronic components of the subsea electrical device are disposed in the first chamber. Such components may for example include sensor electronic components used to operate a sensor element or process sensor data; in other applications, such as when used with a subsea control module, the first chamber may comprise control electronics or the like.

In an embodiment, the second housing portion comprises at least a second chamber. The second chamber may be a pressure compensated chamber that is pressure balanced against an ambient pressure, in particular against the seawater pressure when installed subsea. By making use of such pressure compensated chamber, the sealing of the chamber may be facilitated since the pressure difference across the walls of the chamber can be kept low. Furthermore, the walls of the second housing portion may thus not need to be capable of withstanding the relatively high subsea pressures, so that a more compact and lightweight subsea housing assembly can be achieved.

The second coupling section may be disposed in the second chamber. The second chamber may be filled with an (substantially) incompressible medium, such as a liquid or gel, in particular a dielectric liquid. Examples are oil or Midel (synthetic ester-based liquid).

In an embodiment, the second housing portion comprises a pressure compensator providing the pressure compensation. Additionally or alternatively, the second housing portion may be connected to a subsea cable in form of a medium (in particular oil) filled hose. The second chamber may be pressure compensated via the oil filled hose. As an example, there may be a flow communication between the second chamber and an inner volume of the medium filled hose so that the pressure inside the second chamber can be equalized. In other embodiments, separation between these volumes may be provided, for example by means of a membrane, a bellows or the like.

In an embodiment, the wall is a pressure barrier providing separation between a first chamber in the first housing portion and a second chamber in the second housing portion. The first chamber may be a pressure resistant chamber or pressure compensated chamber, and the second chamber may be a pressure resistant chamber or a pressure compensated chamber. Advantageously, the first chamber is pressure resistant whereas the second chamber is pressure compensated, but it should be clear that in other embodiments, two pressure compensated or two pressure resistant chambers may be provided in the subsea housing assembly. As an example, the second chamber may comprise a penetrator providing a pressure barrier between the inside of the second chamber and a medium (or oil) filled hose.

In an embodiment, the wall is integrally formed with a first housing body of the first housing portion. The first housing body may for example be shaped like a metal canister having an opening through which part of a sensor extends and that is sealed to a metal body, such as a pipe section or the like (where the subsea sensor is installed). The first housing body may be a single piece metal body.

In other embodiments, the first housing portion comprises plural housing parts, and the housing parts are advantageously sealed to each other by metal seals. It is noted that the expression "single peace metal body" does not imply that the housing portion cannot comprise further elements mounted to such single peace metal body, but it means that the part of the first housing portion that includes the wall provides the pressure barrier and that is sealed to, e.g., a pipe section (or another part of the first housing portion) is formed integrally from a single piece of material. A safe and reliable pressure barrier within the subsea housing assembly may thus be obtained, which may be capable of withstanding large to very large pressure differences, such as between the process fluid pressure and the surrounding ambient pressure.

In an embodiment, the second housing portion is fixedly mounted to the first housing portion. As an example, the second housing portion may be bolted to or welded to the first housing portion. A reliable connection between the first and second housing portions may thus be achieved.

As an example, the second housing portion may comprise an enclosure having an opening. The second housing portion may be attached to the first housing portion such that the opening is closed and sealed by the first housing portion. The opening may for example be at least partly closed by the wall across which the inductive coupling is provided. The second coupling section may be located in or adjacent to such opening. Accordingly, assembly of the subsea housing assembly may be facilitated, since when mounting the second housing portion to the first housing portion, no electrical connections have to be established.

Sealing between the first and second housing portions may be provided by O-ring seals, for example two elastomeric O-ring seals. For example when the second chamber is a pressure compensated chamber, such seals may provide reliable sealing since the differential pressure is relatively low. Mounting the first and second housing portions together generally occurs topside, i.e. the first and second housing portions may not be connectable in a subsea environment.

In an embodiment, the first coupling section and/or the second coupling section of the inductive coupler are provided by a respective coil. The coil is connected to the respective electrical connection. As an example, the coil in the second housing section may be driven by an AC current that can be modulated for data communication. The resulting electromagnetic field can induce a current in the coil of the first coupling section in the first housing portion. Electrical power and data communication signals (which can include control signals) may thus be transferred into the first housing portion. Similarly, a modulated current can be provided to the coil of the first coupling section, which induces a respective current in the second coupling section, for example for transferring sensor data or the like.

In an embodiment, the first coupling section comprises an inner coil and the second coupling section comprises an outer coil, or vice versa. The outer coil may at least partly surround the inner coil. At least part of the wall may extend between the inner coil and the outer coil. As an example, the wall may be shaped so as to extend around the inner coil such that it surrounds the inner coil for at least part of its width, and covers one side of the inner coil. Around this wall section, the outer coil may extend.

In an embodiment, the first coupling section comprises a first coil and the second coupling section comprises a second coil, and the first and second coils may be arranged an opposite sides of the wall. The coils may be arranged substantially coaxially, they may be arranged coaxially.

In some embodiments, the coils of the first and second coupling sections may have substantially the same diameter, and the wall may comprise a planar wall section arranged between the coils.

Advantageously, the coil of the first coupling section is an inner coil, and the coil of the second coupling section is an outer coil that extends around the inner coil.

According to a further embodiment of the invention, a subsea sensor comprising a subsea housing assembly in accordance with any of the above described configurations is provided. The subsea sensor may comprise a sensor element that is disposed in the first housing portion. The first electrical connection may be configured for communicating with the sensor element (for example for transferring raw or processed sensor data). The second electrical connection may be configured to provide at least a sensor output of the subsea sensor. As an example, sensor data from the sensor element may be communicated via the first electrical connection, the inductive coupler and the second electrical connection to an output of the subsea sensor.

As mentioned further above, the first housing portion may comprise a further pressure barrier, and the sensor element may for example be arranged in a region where it is exposed to the pressure of a process fluid. The housing may comprise a first chamber (disposed behind the first pressure barrier) comprising sensor related electronics, and further comprising a transmitter/receiver for providing data communication by means of the inductive coupler.

In an embodiment, the first chamber and/or the second chamber comprises a receiver and a transmitter, or a transceiver, for providing data communication via the inductive coupler.

In an embodiment, the first housing portion comprises a sensor assembly that includes a first pressure barrier between a process fluid to be probed by the subsea sensor and a first chamber in the first housing portion. The wall may constitute a second pressure barrier. Accordingly, if the first pressure barrier should fail, the pressure of a process fluid may effectively be confined to within the first housing portion.

It is to be understood that the features mentioned above and those yet to be explained below cannot only be used in the respective combinations indicated, but also in other combinations or in isolation without leaving the scope of the present invention. In particular, it should be clear that the subsea housing assembly may be employed with subsea devices other than subsea sensor, such as a subsea electronic canister, subsea control unit/module or the like.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION

In the following, embodiments of the invention will be described in detail with reference to the accompanying drawings. It is to be understood that the following description of the embodiments is given only for the purpose of illustration and is not to be taken in a limiting sense. The drawings are to be regarded as being schematic representations only, and elements in the drawings are not necessarily to scale with each other. Rather, the representation of the various elements is chosen such that their function and general purpose become apparent to a person skilled in the art.

Figure 1:
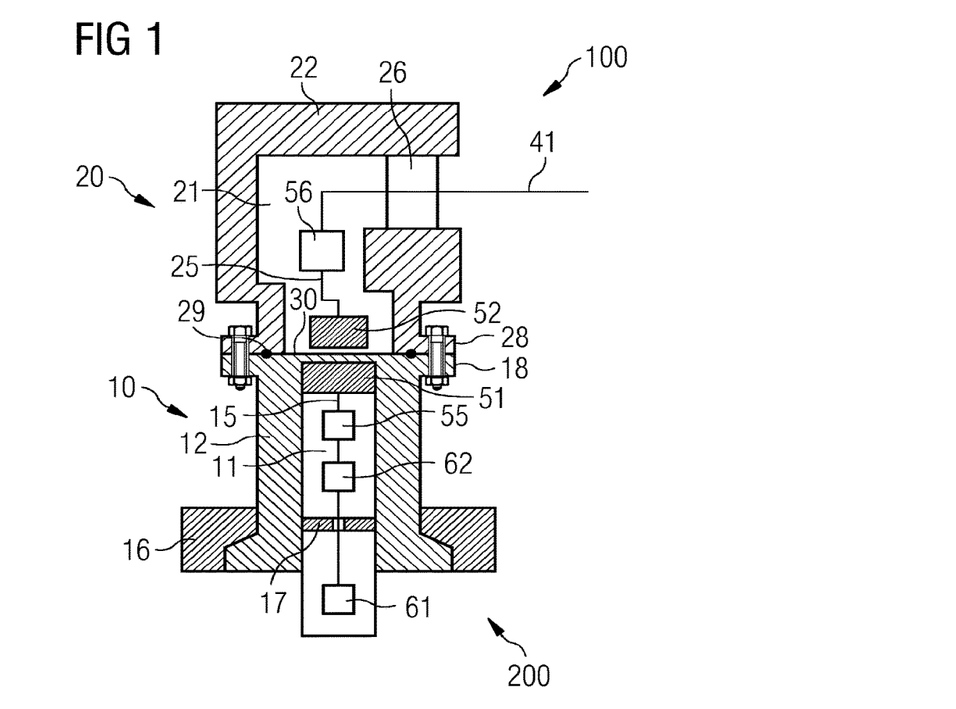
FIG. 1 is a schematic diagram showing a subsea housing assembly and a subsea sensor according to an embodiment of the invention.

FIG. 1 is schematic drawing showing a subsea housing assembly 100 that is part of a subsea sensor 200. The subsea housing assembly 100 includes a first housing portion 10 and a second housing portion 20. The first housing portion 10 includes a first housing body 12 and a first chamber 11. The second housing portion 20 includes a second housing body 22 and a second chamber 21. The first and second housing bodies 12, 22 include flanges 18, 28, respectively, by means of which they are fixedly attached to each other. In the present example, both housing portions are bolted together.

The first housing body 12 substantially surrounds the first chamber 11. In particular, the first housing portion 10 includes a wall 30 that provides a pressure barrier. This allows application of a high pressure difference across the walls of the first housing body 12. In particular, and as illustrated in FIG. 1, the wall 30 can be formed integrally, i.e. as part of the first housing body 12. In such configuration, no seals are required between the wall 30 and the remaining portions of the first housing body 12. The wall 30 provides separation between the first chamber 11 and the second chamber 21. Accordingly, a save and reliable sealing can be provided between the first and second chambers 11, 21 that is capable of withstanding high pressure differences, for example in excess of 1,000 or even 2,000 bar.

At the other end, the first housing portion 10 may simply be closed, for example by means of a closing plate or the like. Such configuration may be employed when the subsea housing assembly 100 is used for a subsea canister, such as a subsea electronic canister or a control canister or control module. In the embodiment of FIG. 1, the subsea housing assembly 100 is used for a subsea sensor 200, and a further pressure barrier (first pressure barrier) 17 is provided in the first housing portion 10. The first pressure barrier 17 provides sealing of the first chamber 11 towards a part of the first housing portion 10 in which a sensor element 61 is located and exposed to high pressures, such as the high pressure of a process fluid. Note that such exposure may be a direct exposure, or an indirect exposure, for example via a respective process diaphragm and a pressure transmission fluid such as oil or the like.

When embodied as subsea sensor as in FIG. 1, the first chamber 11 may comprise sensor electronics 62, such as control electronics, data processing electronics and the like. The first chamber 11 may be a pressure resistant chamber in which a predefined pressure is maintained, even when the subsea housing assembly 100 is installed at a subsea location. Such pressure may be a pressure below 10 bar, it may advantageously be a pressure below 5, or even below 1.5 bar. A close to atmospheric pressure may prevail in the first chamber 11, which may thus be termed an atmospheric chamber. Chamber 11 may be filled with a gas, such as nitrogen, or a gas mixture, such as air or a mixture of nitrogen with other gasses. It may thus be possible to operate conventional electric and electronic components within chamber 11.

Accordingly, in the configuration of the subsea housing assembly as illustrated in FIG. 1, high pressures, such as of a process fluid, can effectively be confined to within the first chamber 11, even if the first pressure barrier 17 fails. The first pressure barrier 17 may for example comprise a feed through for an electric connection to the sensor element 61, or the sensor element 61 may itself be configured so as to constitute a pressure barrier. Under certain conditions, such pressure barrier may fail, thus allowing high pressure fluid to enter chamber 11. Since wall 30 is provided that does not comprise any feed through, the pressure can be confined effectively within the first housing portion 10.

For providing a data communication with an electronic component within the first housing portion 10, an inductive coupler 50 comprising a first coupling section 51 and a second coupling section 52 is provided. The first coupling section 51 is disposed in the first chamber 11 and connected to an electrical connection 15 that provides at least data communication, in particular with the sensor element 61 or the sensor electronics 62 in the example of FIG. 1. The second coupling section 52 is disposed in the second chamber 21 and is connected to a second electrical connection 25 in the second housing portion 20. The inductive coupler 50 provides at least data communication between the first and second electrical connections 15, 25 across the wall 30. Besides transmitting data communications, the coupler 50 is further more configured to transfer power from the second electrical connection 25 to the first electrical connection 15.

The first and second coupling sections 51, 52 may for example be implemented as coils. An alternating current (AC) provided to the second coupling section 52 may for example induce a current in the first coupling section 51, which provides power to electric and electronic components comprised in the first housing portion 10. This way, sensor electronics 62 and sensor element 61 may be powered. For data transmission, modulation may be provided. As an example, the current applied to the coil 52 may be modulated, and such modulation will lead to a modulation of the current induced in the first coupling section 51. For this purpose, a receiver/transmitter 56 can be provided in the second housing portion 20 and can be coupled to the second electrical connection 25. Unit 56 can include a receiver and a transmitter, and it may modulate control signals received on line 41 for transmission via the inductive coupler 50, and it may demodulate signals received from the second coupling section 52 for further transmission via the line 41. Note that the transmitter/receiver 56 may also be located at a different position, for example at the other end of line 41, topside or the like.

Similarly, a transmitter/receiver 55 is provided in the first housing portion 10 in chamber 11 and is connected to the first electrical connection 15 and the first coupling section 51. Unit 55 may for example detect a modulation of a current received from the first coupling section 51 and may provide corresponding control signals to the sensor electronics 62. Unit 55 may further receive sensor data from the sensor electronics 62 and may modulate such sensor data onto a signal that is provided to the first coupling section 51, so that a current is induced in the second coupling section 52 that is detected and demodulated by transmitter/receiver unit 56. Accordingly, data recorded by the sensor element 61 can be communicated on line 41, without requiring penetration of wall 30 that provides the secondary pressure barrier.

The inductive coupler including the first and second coupling sections 51, 52 may also be implemented differently. As an example, a GHz or microwave transmitter/receiver may be provided for transmitting power and communication signals across the wall 30. Furthermore, the inductive coupler may comprise plural coupling sections, for example some dedicated to the transfer of electrical power and others dedicated to the transfer of data communications. Advantageously, power and data communications are transmitted by the same coupling sections.

As the pressure is confined to within the first housing portion 10 by means of wall 30, the sealing of the second housing portion 20 is facilitated. In particular, the second chamber 21 can be a pressure compensated chamber the pressure of which is balanced to the surrounding ambient pressure, in particular the subsea pressure when the housing assembly 100 is installed subsea. The differential pressure across the walls of the second housing body 22 is accordingly relatively low. In the example of FIG. 1, the housing body 22 has an opening in which the second coupling section 52 is located. This opening is sealed against the first housing body 12, for example by means of O-ring seals 29. Double seals are advantageously provided.

The second chamber 21 can be filled with a substantially incompressible medium, in particular a dielectric liquid or gel, such as oil or the like. The electric and electronic components of the unit 56 can be adapted to operate in such environment, or, as mentioned above, unit 56 may be located outside the second chamber 21, for example in a subsea canister to which the sensor 200 is connected or topside. Pressure compensation can occur by means of a dedicated pressure compensator forming part of the subsea housing assembly 100 (not shown). In other embodiments, the subsea housing assembly 100 may be connected to a subsea cable in form of an oil filled hose, wherein the inner volume of such hose is filled with a dielectric liquid (in particular oil) and is pressure compensated against the ambient environment due to the flexibility of the hose. Pressure compensation of the second chamber 21 can occur via such hose, for example by allowing a flow communication through the opening 26 between the inner volume of the hose and the second chamber 21, or by providing some pressure transmitting element in the opening, such as a membrane or bellows.

In other configurations the second chamber 21 can be a pressure resistant chamber. As an example, a predefined pressure below 10 bar, advantageously below 5 bar or below 1.5 bar, such as close to atmospheric pressure may be maintained in second chamber 21. For this purpose, a penetrator providing a pressure barrier can be provided in the opening 26. Since such penetrator has to withstand the differential pressure between the interior pressure of second chamber 21 and the external subsea pressure when installed subsea, the pressure difference is relatively low compared to the pressure difference that can prevail when a barrier is exposed to the pressure of process fluid, such as the barrier provided by wall 30.

The second housing portion 20 may for example comprise a fitting or connector for providing a connection to a subsea cable. In other configurations, a further unit, such as a control module or the like, may be mounted directly to the subsea housing assembly 100.

The first coupling section 51 and the second coupling section 52 can be mounted fixedly to their respective first or second housing bodies 12, 22, they may for example be welded. Furthermore, by providing the inductive coupler 50, problems related to insulation resistant may be overcome. In particular, insulation resistance would in such case be measured between the metal cage provided by the first and second housing bodies 12, 22 and the respective coupling section 51, 52, so that insulation resistance can be kept high. In particular, since no glass penetrators are used, the insulation resistance can also be maintained during high pressure testing.

Figure 2:
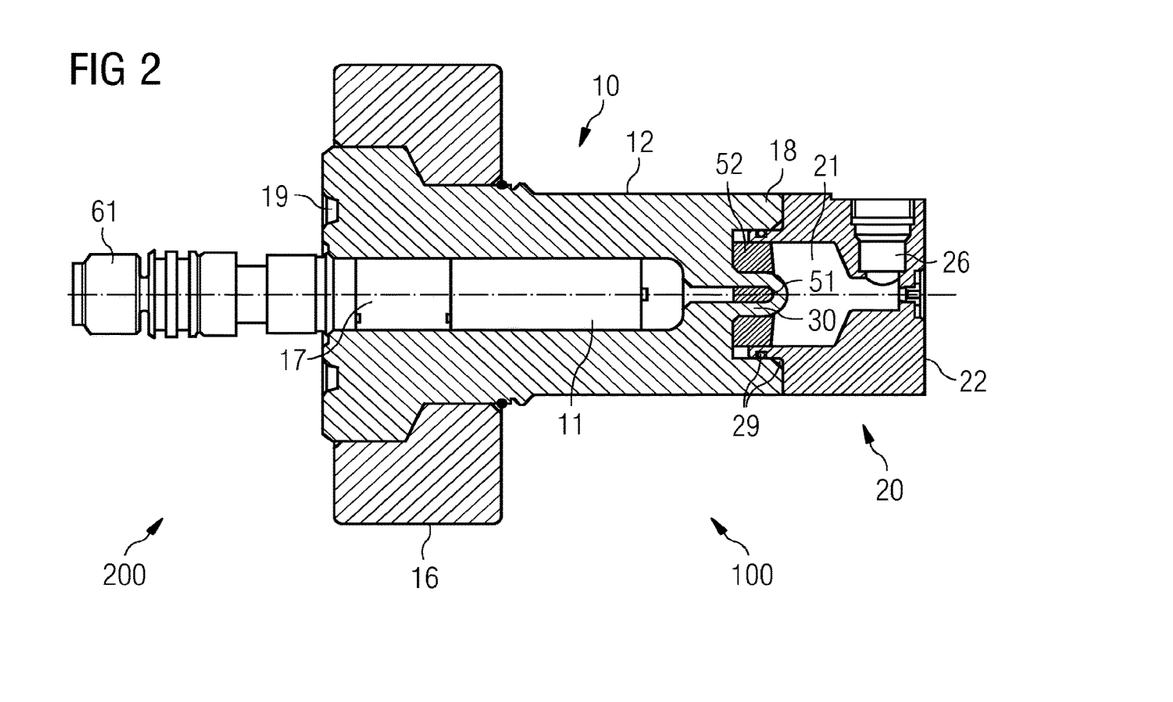
FIG. 2 is a schematic diagram showing a subsea sensor comprising a subsea housing assembly according to an embodiment of the invention.

FIG. 2 illustrates a further embodiment of a subsea housing assembly 100 which forms part of another embodiment of a subsea sensor 200. Accordingly, the explanations given above with respect to FIG. 1 are equally applicable to the embodiment of FIG. 2, and only the differences are explained in more detail hereinafter. The first housing portion 10 is provided with a seal 19 for sealing against a subsea device, in particular a metal body, such as a pipe section. The seal 19 is advantageously provided in form of a metal seal, in particular a metal gasket.

In the embodiment of FIG. 2, the first coupling section 51 is provided in form of an inner coil, and the second coupling section 52 is provided in form of an outer coil that extends around the inner coil. Both coils are arranged coaxially. The wall 30 extends between the first and second coupling sections 51, 52. Accordingly, in the example of FIG. 2, the wall 30 is curved and extends around the inner coil. Again, wall 30 is formed integrally with the first housing body 12 of the first housing portion 10. By such configuration, an efficient transfer of data communication and electrical power may be achieved while maintaining an effective and secure pressure barrier between the first and second chambers 11, 21.

In the embodiment of FIG. 2, the second housing body 22 has a smaller diameter portion that is attached to a larger diameter portion (flange 18) of the first housing body 12. As an example, the second housing body 22 may be screwed into the first housing body 12. Between both housing bodies, seals 29 are provided, which can be in the form of elastomeric or metal O-ring seals. The opening 26 has the form of a fitting, into which the end of a subsea cable, such as an oil filled hose, can be screwed or otherwise be attached. As an example, it may be an MKII fitting. A mounting flange 16 is provided for mounting the subsea housing assembly 100 to the other subsea device, in particular pipe section.

In FIG. 2, the electrical connections 15, 25 as well as other electrical and electronic components are emitted for the purpose of a clear presentation. It should be clear that these components may certainly be present.

Figure 3:
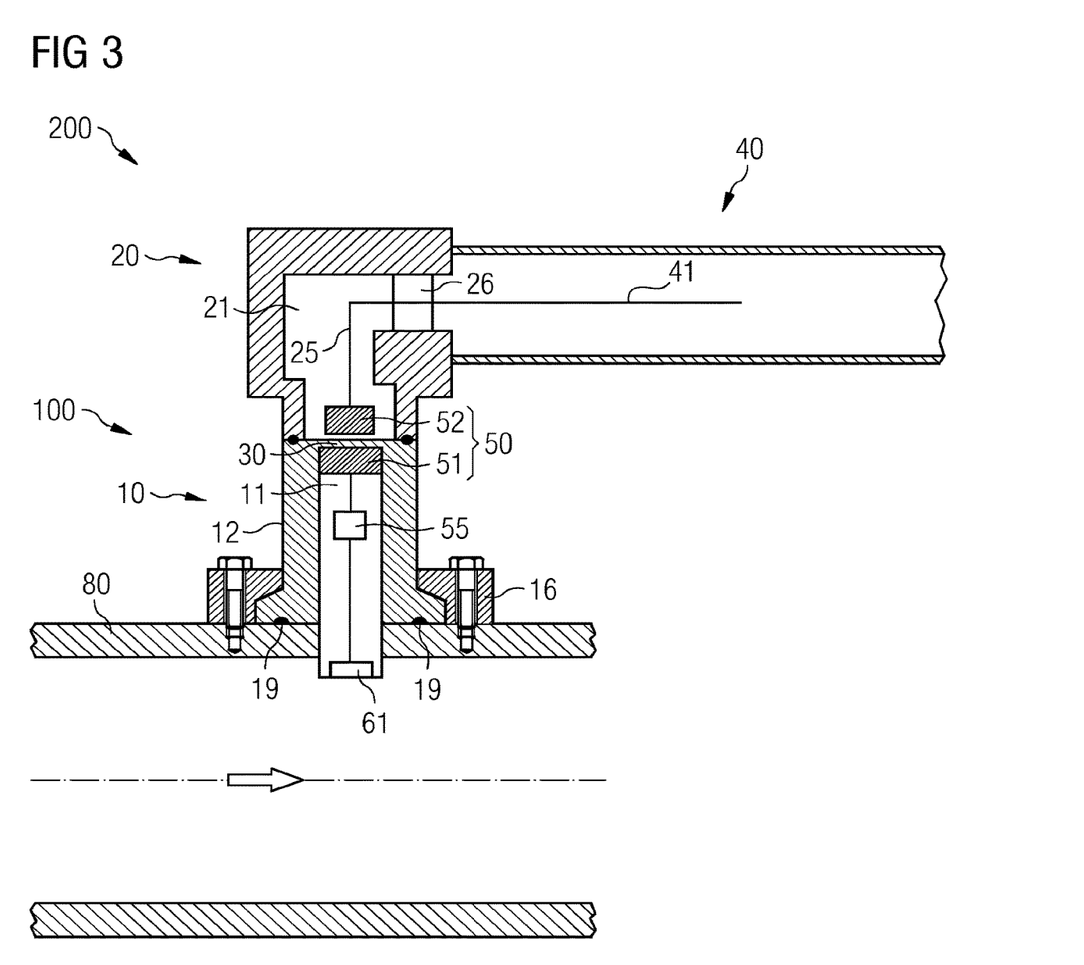
FIG. 3 is a schematic diagram showing a subsea housing assembly mounted to a pipe section according to an embodiment of the invention.

In FIG. 3, a further embodiment of a subsea housing assembly 100 that is part of a embodiment of a subsea sensor 200 is illustrated. The explanations given further above with respect to FIGS. 1 and 2 are equally applicable to the embodiment of FIG. 3. In FIG. 3, the subsea housing assembly 100 is mounted to a subsea device 80 in form of a pipe section through which a process fluid flows. As can be seen, by means of the mounting flange 16, the first housing body 12 is pressed against the subsea device 80 and sealed by means of the seal 19, which can be a metal gasket. Note that two seals 19 may be provided to provide a double barrier.

Sensor element 61 may for example measure temperature and/or pressure of the process fluid flowing through the pipe section, and respective readings may be modulated and transmitted by the transmitter/receiver 55 via the inductive coupler 50.

To the port opening 26 of the second housing portion 20, a subsea cable in form of an oil filled hose 40 is mounted. Note that the subsea cable may form part of the subsea sensor 200, and that a (wet mate or dry mate) connector may be provided at the other end of the subsea cable 40 for connecting the sensor 200 to another subsea device or to a topside installation. In the example of FIG. 3, the line 41 of the subsea cable 40 is directly connected to the second electrical connection 25 and the second coupling section 52. It should be clear that in other embodiments, further electric and electronic components, such as the transmitting/receiving unit 56, can be provided. Again, it is noted that the opening 26 may in some embodiments allow a flow communication between the interior of subsea cable 40 and the second chamber 21, while in other embodiments, separation may be provided. Such separation can be provided by a pressure transmitting element such as a membrane, or by means of a penetrator which allows the maintaining of a pressure difference across the opening 26.

The subsea housing assembly 100 is described above with respect to the use in a subsea sensor 200, yet it should be clear that it may also be used in other applications, in particular where the integrity of a pressure barrier is of importance, for example for protecting electric and electronic components. Such applications may include the application in a subsea control unit where the integrity of a one atmospheric chamber needs to be ensured. Other applications are conceivable.

While specific embodiments are disclosed herein, various changes and modifications can be made without departing from the scope of the invention. The present embodiments are to be considered in all respects as illustrative and non restrictive, and all changes coming within the meaning and equivalency range of the appended claims are intended to be embraced therein.

The invention claimed is:

1. A subsea housing assembly, comprising: a subsea housing, the subsea housing including:
   a first housing portion, the first housing portion including a first electrical connection configured to receive data communication of sensor readings, and
   a second housing portion, the second housing portion including a second electrical connection for data communication;
   a wall to provide separation between the first housing portion and the second housing portion of the subsea housing; and
   an inductive coupler including a first coupling section disposed in the first housing portion and a second coupling section disposed in the second housing portion, the inductive coupler being configured to provide inductive coupling across the wall to provide at least a data communication between the first electrical connection in the first housing portion and the second electrical connection in the second housing portion, wherein the first housing portion includes a first chamber, the first chamber including one of a pressure resistant chamber or a pressure compensated chamber, and the second housing portion includes a second chamber, the second chamber including one of a pressure resistant chamber or a pressure compensated chamber;
   wherein the first coupling section includes a first coil positioned along a central axis of the first housing portion and the second coupling section includes a second coil, the first and second coils being arranged on opposite sides of the wall and the first and second coils being arranged substantially coaxial and wherein the wall is curved and intersects the central axis;
   wherein the second chamber is pressure balanced against an ambient pressure; and
   wherein the second housing portion is connected to a subsea cable in form of a medium filled hose, the second chamber being pressure compensated via the medium filled hose.

2. The subsea housing assembly of claim 1, wherein the curved wall forms an apex that intersects the central axis.

3. The subsea housing assembly of claim 1, wherein the wall is integrally formed with a first housing body of the first housing portion.

4. The subsea housing assembly of claim 3, wherein the wall is integrally formed from a single piece of material with the first housing body of the first housing portion.

5. The subsea housing assembly of claim 1, wherein the second housing portion is fixedly mounted to the first housing portion.

6. The subsea housing assembly of claim 5, wherein the second housing portion is screwed or bolted to the first housing portion, wherein a flange integrally formed with the second housing portion defines openings and wherein a flange integrally formed with the first housing portion defines openings,
wherein the second housing portion is screwed or bolted to the first housing portion by passing screws or bolts through the openings in the flange of the second housing portion and the openings in the flange of the first housing portion.

7. The subsea housing of claim 1,
wherein the second housing portion including a first opening to pass the second electrical connection for data communication into the second housing portion and a second opening continuous with the first opening;
wherein the second chamber is continuous with the first opening and the second opening.

8. The subsea housing of claim 7,
wherein the second housing portion being attached to the first housing portion such that the second opening is closed and sealed by the first housing portion, and wherein the second opening is at least partly closed by the wall across which the inductive coupling is provided.

9. The subsea housing of claim 8,
wherein the second housing portion is screwed or bolted to the first housing portion such that the second opening is closed and wherein a seal is provided between the first housing portion and the second housing portion to seal the second opening.

10. The subsea housing assembly of claim 1,
wherein the first coupling section includes an inner coil and the second coupling section includes an outer coil, the outer coil at least partly surrounding the inner coil and at least part of the wall extending between the inner coil and the outer coil and wherein the wall extends around the inner coil.

11. A subsea housing assembly, comprising: a subsea housing, the subsea housing including:
    a first housing portion, the first housing portion including a first electrical connection configured to receive data communication of sensor readings, and
    a second housing portion, the second housing portion including a second electrical connection for data communication;
    a wall to provide separation between the first housing portion and the second housing portion of the subsea housing; and
    an inductive coupler including a first coupling section disposed in the first housing portion and a second coupling section disposed in the second housing portion, the inductive coupler being configured to provide inductive coupling across the wall to provide at least a data communication between the first electrical connection in the first housing portion and the second electrical connection in the second housing portion, wherein the first housing portion includes a first chamber, the first chamber including one of a pressure resistant chamber or a pressure compensated chamber, and the second housing portion includes a second chamber, the second chamber including one of a pressure resistant chamber or a pressure compensated chamber;
    wherein the first coupling section includes a first coil positioned along a central axis of the first housing portion and the second coupling section includes a second coil, the first and second coils being arranged on opposite sides of the wall and the first and second coils being arranged substantially coaxial;

wherein the second chamber is pressure balanced against an ambient pressure; and wherein the second housing portion is connected to a subsea cable in form of a medium filled hose, the second chamber being pressure compensated via the medium filled hose.

\* \* \* \* \*